July 18, 1961 L. MANZANERA 2,992,769
ROTARY FLUID COMPRESSORS
Filed March 20, 1957 5 Sheets-Sheet 5
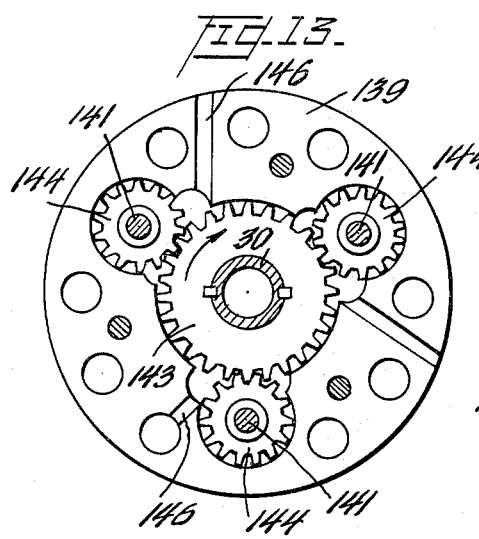
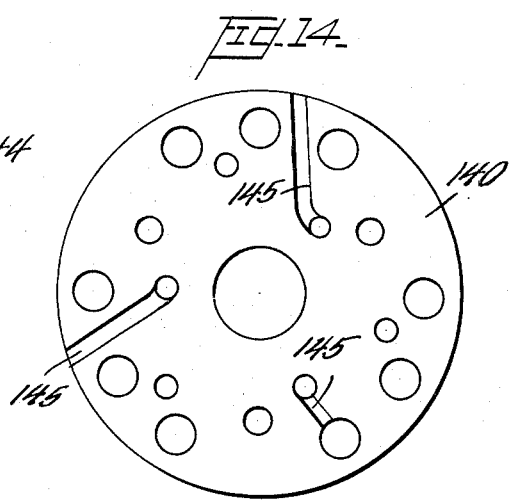
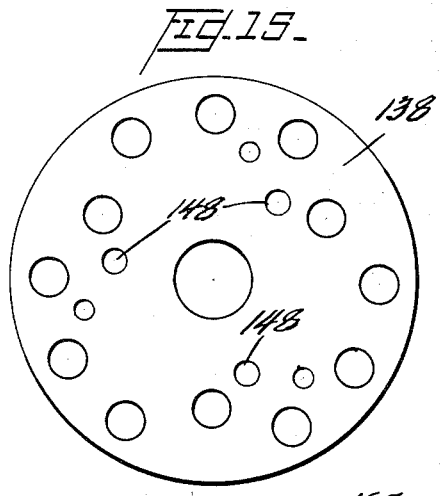
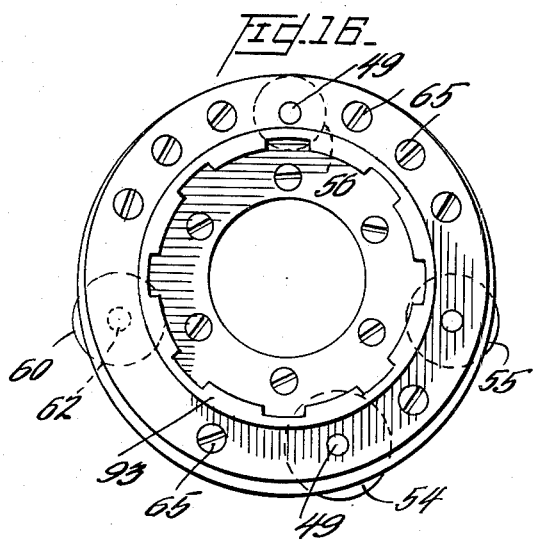
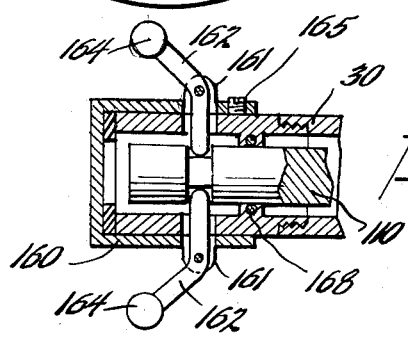
INVENTOR
*Lorenzo Manzanera*
BY *Watson, Cole, Grindle & Watson*
ATTORNEYS United States Patent Office 2,992,769
Patented July 18, 1961

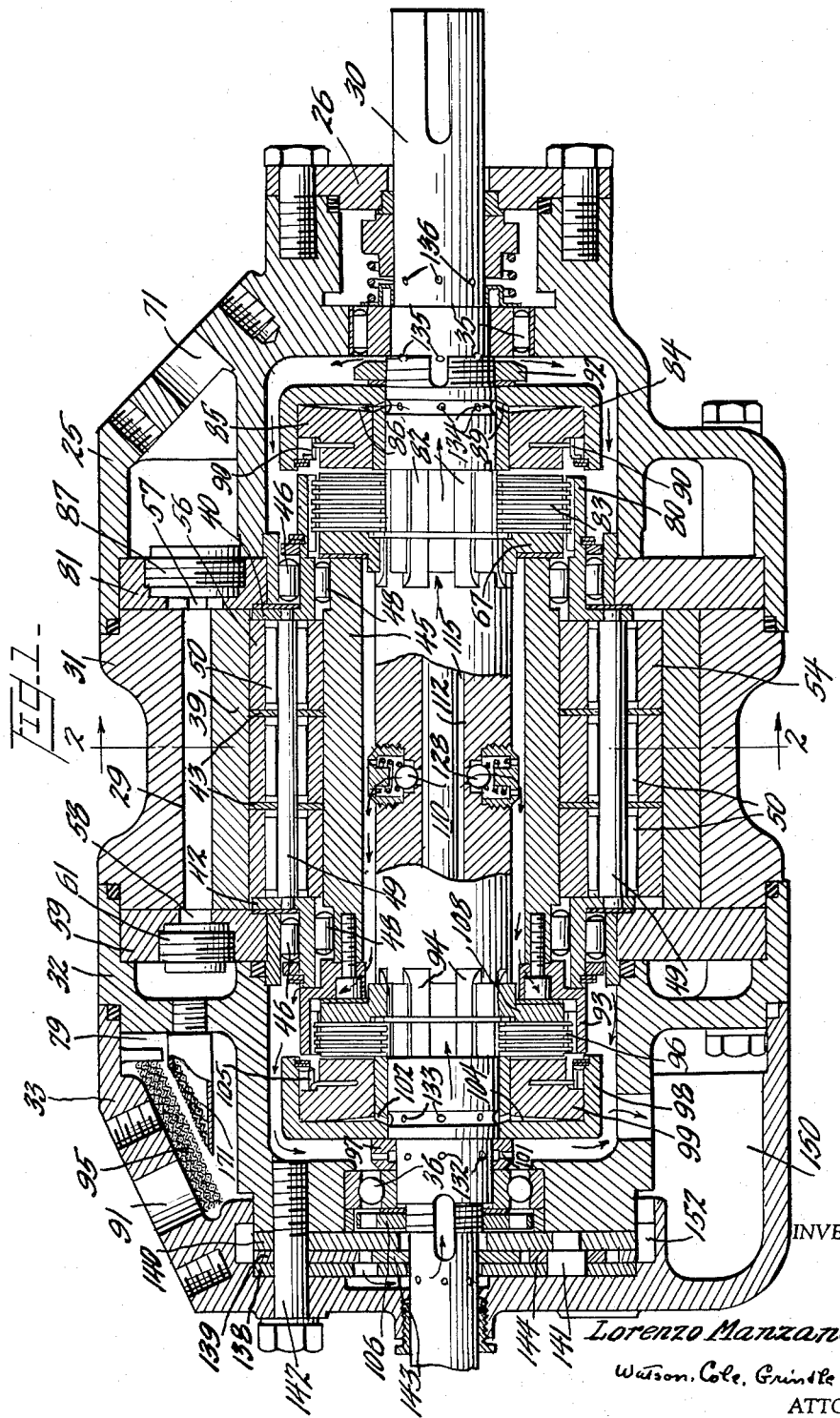

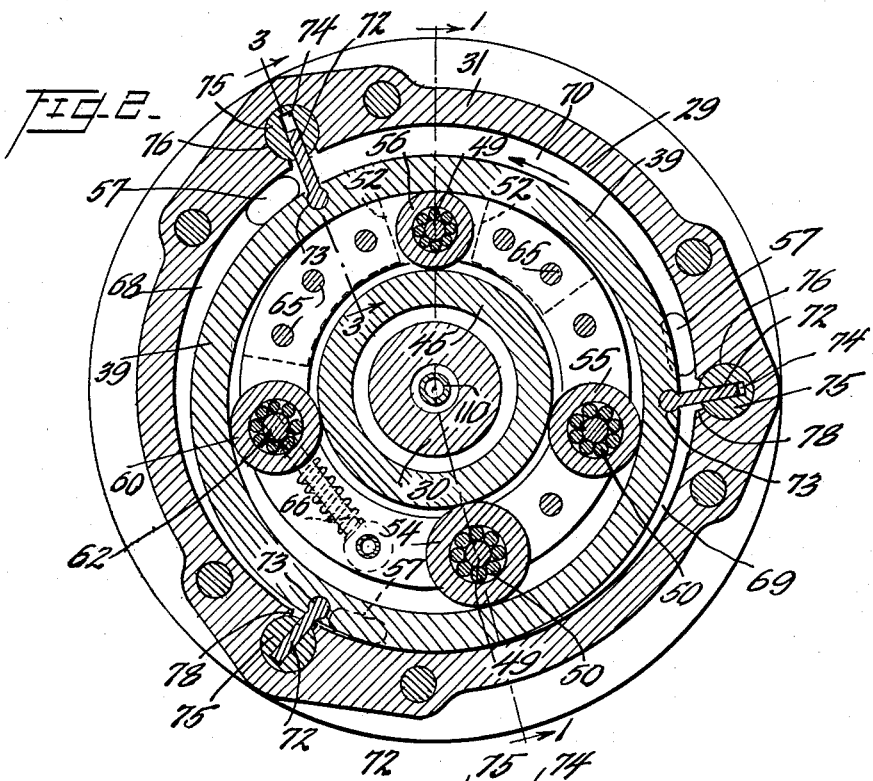

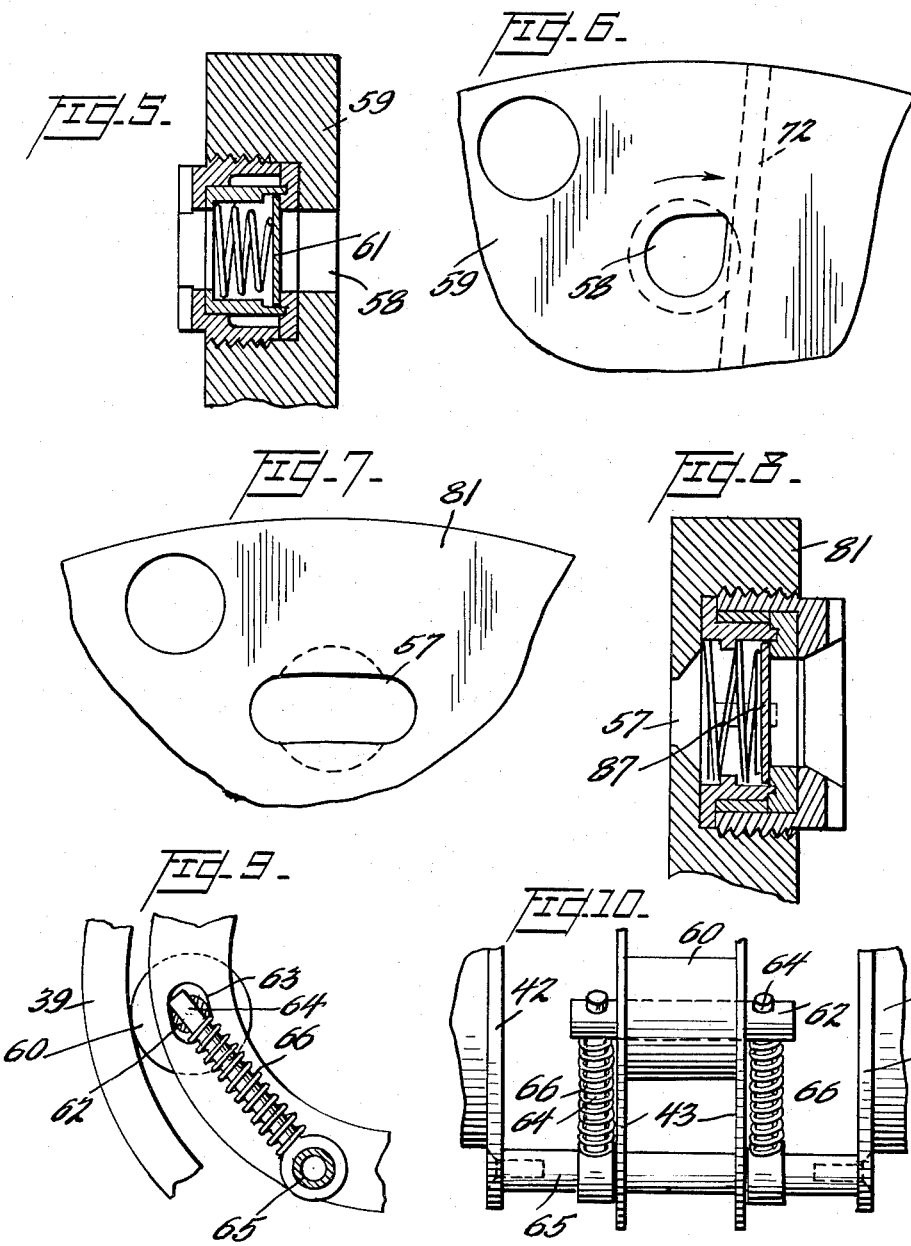

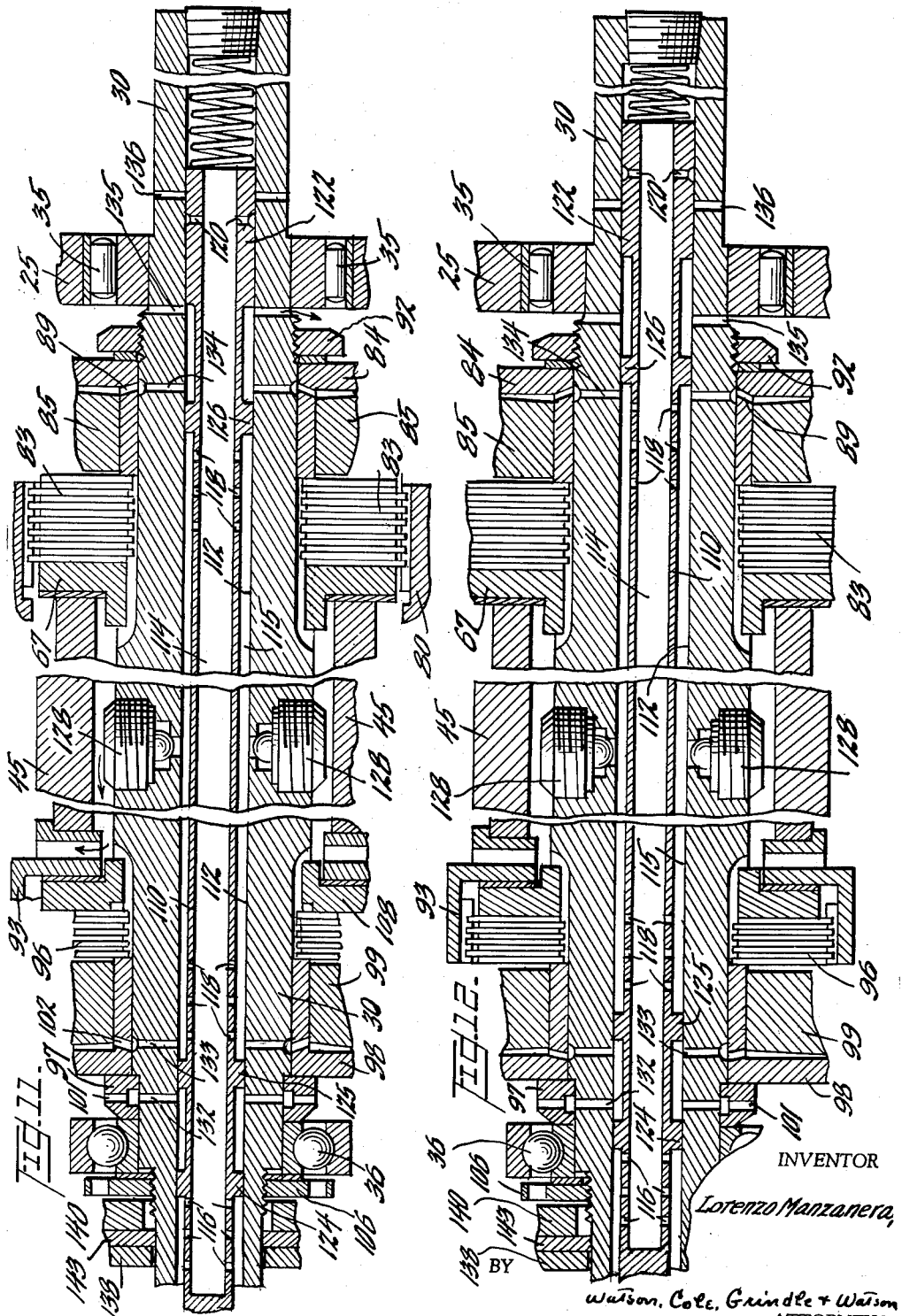

2,992,769
ROTARY FLUID COMPRESSORS
Lorenzo Manzanera, San Antonio, Tex., assignor to Petty Laboratories, Inc., San Antonio, Tex., a corporation of Texas
Filed Mar. 20, 1957, Ser. No. 647,412
3 Claims. (Cl. 230—147)

This invention relates to improvements in rotary compressors of the type employing a cylinder, an annular impeller of external diameter substantially less than the diameter of the cylinder, and a rotary member supported for rotation on the cylinder axis and having eccentric means engaging the inner surface of the impeller to impart to the latter an orbital or gyratory movement such that the external surface of the impeller maintains circumferentially progressive contact with the cylinder, whereby a fluid, and particularly a gas, admitted to the space between the cylinder and the impeller during part of one cycle of movement of the latter may be compressed in and expelled from such space during a succeeding part of the cycle.

It is an object of the invention to provide, in a compressor of the type indicated, a rotary member in which the eccentric means is constituted by a plurality of rollers journaled on said rotary member at circumferentially spaced points and on axes parallel to the cylinder axis, the rollers being of different diameter. The inner peripheral portions of the rollers engage and roll on the external cylindrical surface of an annular sun member concentric with the cylinder axis while the outer peripheral portions of the rollers engage and roll within the inner cylindrical surface of the annular impeller. The rotary member on which the rollers are mounted thus constitutes a planet carrier, and if rotation of the impeller is restrained and the sun member is rotated, the planet carrier will be rotated in the direction of the sun member and at a slower speed, as in any planetary system. It is a feature of the invention that selectively operable clutches are provided to couple either the sun member or the planet carrier to a driving shaft located within the sun member, whereby the impeller may be driven at either of two speeds.

Provision for driving the impeller at different speeds is especially useful in a compressor employed in an air conditioning system for motor vehicles, wherein the vehicle motor, ordinarily belted to the compressor drive shaft to rotate the latter, is necessarily operated at widely varying speeds.

The displacement of compressors of the type described may be substantially increased by dividing the compression space between the cylinder and the impeller into a plurality of separate chambers. For instance, it can be shown that in a compressor constructed as hereinafter described, employing three compression chambers, and provided with valved inlet and outlet ports, the volumetric displacement of the pump is increased by at least 60% over the displacement of a pump otherwise similar but having only one chamber. Preferably the separate chambers are formed by circumferentially spaced vanes supported for slight pivotal movement in both the cylinder and the impeller, provision being made for radial sliding movement of the vanes in one of these members to accommodate the gyratory movement of the impeller.

It will be appreciated that in devices of this character, the eccentric member is subjected to a radial thrust of varying intensity, the thrust being at a maximum during certain portions of the cycle when the maximum compressive force is being applied to fluid entrapped in the chambers. At high speed operation, in conventional compressors, this thrust applies to the driving shaft a vibrative force which cannot be compensated adequately by counterbalancing the eccentric member. It is a feature of the instant invention that the transmission of this radial thrust to the driving shaft is avoided by journaling both the eccentric member (the planet carrier) and the sun member directly on the external housing in which the cylinder is formed, connection being effected between the driving shaft and the sun member or the planet carrier only through the selectively operable clutches hereinbefore mentioned. These clutches are preferably of the multiple plate type, so that no substantial force other than the torque required to drive the compressor is applied to the shaft, vibration and damaging flexure of the shaft being substantially eliminated.

Preferably the clutches are engaged by applying thereto oil under pressure derived from an oil pump, which also serves to supply oil for lubrication to the moving parts of the compressor. On failure of the oil pump or depletion of the oil, neither clutch may remain engaged, whereupon operation of the compressor is discontinued and damage to the compressor components is avoided. The supply of oil under pressure to the clutches may be selectively controlled by operation of a suitable valve or valves, which may in turn be made responsive to the speed at which the compressor drive shaft is rotating, or to variation in pressure developed by the oil pump as a function of the speed of the drive shaft, so that automatic selection of the appropriate clutch may be achieved, the sun member being coupled to the drive shaft when the latter is rotating at high speed, and the planet carrier being coupled to the drive shaft when the latter is rotating at low speed.

It is a further feature of the invention to provide a neutral position of the control valve, wherein neither clutch is engaged, during which time oil pumped by oil pump is merely circulated through the crankcase and returned to the oil reservoir. Provision is made for insuring an adequate supply of lubricant to all working components of the compressor at all times during operation thereof, and a release valve, opening in response to excessive oil pressure, is provided to bypass oil back to the crankcase.

Further objects and features of the invention will be apparent from the following description taken in connection with the accompanying drawings, in which FIGURE 1 is a longitudinal sectional view of a compressor embodying the invention, taken substantially on the line 1—1 of FIGURE 2, but modified slightly to show intake and outlet ports for fluid, FIGURE 2 is a vertical transverse section on the line 2—2 of FIGURE 1, FIGURE 3 is a fragmentary section on the line 3—3 of FIGURE 2, FIGURE 4 is a fragmentary section on the line 4—4 of FIGURE 3, FIGURES 5 and 8 are enlarged sectional views of valves employed to control respectively exhaust ports and intake ports for fluid, FIGURES 6 and 7 are end elevations respectively of the structures shown in FIGURES 5 and 8, FIGURES 9 and 10 are detail views, illustrating the method of supporting an idler roller for positioning the impeller, FIGURES 11 and 12 are enlarged longitudinal sectional views through the drive shaft and associated elements, illustrating the method of selectively controlling the impeller speed, and showing the control valve in each of two positions, FIGURES 13 to 15 inclusive are views of details of the lubricant pump, FIGURE 16 is an end elevation of the planet carrier and associated elements for driving the impeller, and FIGURE 17 is a fragmentary sectional view showing speed responsive means for operating the control valve.

To promote an understanding of the invention, reference will now be made to the preferred embodiment thereof illustrated in the accompanying drawings, and specific language will be used to describe the same. It will nevertheless be appreciated that no limitation of the scope of the invention is thereby intended, such further modifications and alterations being contemplated as would occur to one skilled in the art to which the invention relates.

Referring first to FIGURE 1 of the drawing, it will be noted that the pump housing is formed in a plurality of sections, bolted or otherwise secured together, the abutting portions of adjacent sections being adequately sealed. These sections comprise an intake bell 25 and the associated end plate 26, through which drive shaft 30 extends, cylinder block 31 in which cylinder 29 is formed, exhaust bell 32 and oil bell 33. Drive shaft 30 is journaled adjacent one end in intake bell 25 by roller bearing 35 and adjacent its other end in exhaust bell 32 by ball bearing 36.

The principal compressor components surround drive shaft 30 and are located within cylinder block 31. These components, shown more particularly in FIGURES 1 to 4 inclusive, include annular impeller 39, which progressively contacts the cylinder 29, planet carrier comprising annular end plates 40, 42 and intermediate plates 43 on which the planet rollers, hereinafter described, are mounted, and annular sun member 45. It will be noted that the planet carrier end plates 40 and 42 are journaled in the compressor housing by bearings 46, and that the sun member 45 is in turn journaled within the planet carrier end plates 40, 42 by bearings 48, whereby radial thrust and vibration applied either to the planet carrier or to the sun member are transmitted directly to the compressor housing, as hereinbefore described.

Extending between planet carrier end plates 40, 42 and through intermediate plates 43 are a plurality of tie bars 65 and three roller shafts 49. Journaled for rotation on each of these shafts by pin bearings 50 are a set of three rollers in axial alignment, intermediate plates 43 extending between adjacent rollers of each set. The rollers of each set are of different diameter, the rollers of largest diameter being designated 54, those of intermediate diameter 55, and those of least diameter 56. The roller shafts 49 are located at different radial distances from the shaft axis so that the radially inward peripheral portions of the rollers of each set are equidistant from the axis and are in engagement with the peripheral surface of sun member 45, which is concentrically mounted as hereinbefore described. The radially outward peripheral portions of the rollers in each set define and move through a cylindrical path which is eccentric to the axis of drive shaft 30, and are in contact with the inner surface of annular impeller 39. An idler roller 60 is journaled on a shaft 62 extending through intermediate plates 43 of the planet carrier, the plates being slotted as indicated at 63 in FIGURE 9 to permit slight circumferential displacement of shaft 62 and idler roller 60. Shaft 62 is apertured at each end, beyond the adjacent intermediate plates 43, to receive spindles 64 with a sliding fit, the spindles being pivoted on an adjacent tie bar 65. Each spindle is surrounded by a coil spring 66 which engages at one end with shaft 62, whereby the shaft and the roller 60 mounted thereon are urged circumferentially to cause the roller 60 to engage yieldably the inner surface of annular impeller 39. This arrangement affords adequate support for the impeller while avoiding the need for extreme accuracy in machining the several elements of the eccentric member constituted by the planet carrier and rollers, and allows automatic take-up for wear. It will be noted that rollers 54 and 55 are nearer to each other than are rollers 55 and 56, for the reason that rollers 54 and 55 take the maximum load; rollers 56 serve primarily to position annular impeller 39, as does idler roller 60. The planet carrier is placed in approximate dynamic balance by weights 52 mounted on the carrier at appropriate locations.

As hereinbefore described, the space between impeller 39 and cylinder 29 is divided to form a plurality of chambers 68, 69 and 70 by blades or vanes 72 which are spaced uniformly in a circumferential direction and are coextensive axially with the impeller and cylinder, the opposed surfaces of the impeller and cylinder being recessed to receive the vanes 72. The recesses 73 in the impeller 39 are formed as circular bores to receive the correspondingly shaped inner edges of the vanes 72, and are of sufficient width at the surface of the impeller to permit slight pivotal movement of the vanes about longitudinal axes. At their outer ends the vanes 72 are received in slots 74 in gibs 75, which are in turn positioned for rotation in circular bores 76 extending lengthwise of cylinder block 31, the vanes being slidable radially in the gibs. The bores 76 open into the space between the cylinder 29 and impeller 39 through axially extending slots 78 of sufficient width measured circumferentially to permit the vanes 72 and gibs 75 to pivot on the bore axes. It will thus be perceived that the vanes 72 are so mounted in the impeller 39 and in the cylinder 29 as to allow the impeller to partake of such slight oscillatory or gyratory movement as is necessary to accommodate its orbital path within the cylinder 29. The vanes 72 further serve to restrain rotation of the impeller 39, thereby enabling the impeller to function as an orbit member within which the rollers 54, 55, 56 and 60 may roll when the unit is being driven from the sun member 45.

Referring to FIGURE 1, fluid to be compressed is admitted through intake port 71 into intake bell 25. Annular end plate 81 is provided at spaced circumferential points with inlet ports 57 opening into compression chambers 68, 69, 70, these ports being controlled by check valves 87, permitting flow of fluid into the chambers only. Each of these ports is located immediately beyond one of the vanes 72, in the direction of rotation of the planet carrier, as shown in FIGURE 2, and is elongated in a circumferential direction to facilitate flow of fluid into the compression chambers during that portion of the cycle in which a chamber in communication with an intake port is increasing in volumetric capacity. As the capacity of the chamber begins to decrease, the associated check valve 87 prevents discharge of fluid from the chamber, and prior to the termination of the compression portion of the cycle for that chamber, the inlet port communicating therewith is closed by engagement of the impeller with the cylinder wall in the vicinity of the port.

Fluid discharging from the compression chambers flows through outlet ports 58 formed at spaced circumferential points in annular end plate 59, each port being controlled by a check valve 61, permitting fluid discharge only. Each of the outlet ports 58 is located immediately in advance of one of the vanes 72, as shown in FIGURES 4 and 6, and is so shaped as to permit expression of oil through the port at that part of the cycle when the impeller contacts the cylinder in the area of the port and the volumetric capacity of the chamber is reduced nearly to zero. From the several outlet ports 58 the discharging fluid passes into annular chamber 170, thence through oil separating screens 171 into annular chamber 79 within oil bell 33 and is expelled through discharge port 91. A filter screen 95, located in chamber 79, extracts residual entrained oil from the discharging fluid, the oil being returned to the reservoir 150. It will be appreciated that the inlet ports 57 and the outlet ports 58 are circumferentially spaced and would not both appear in the same longitudinal section. Both are shown in FIGURE 1 for convenience.

Planet carrier end plate 40 is provided with an internally splined annular collar 80, and drive shaft 30 is externally splined at 82. Alternate clutch plates 83 are thereby keyed to collar 80 and drive shaft 30 to couple these members when axial pressure is applied to effect frictional driving engagement of clutch plates 83. Disposed within planet carrier clutch cylinder 84, which is mounted on shaft 30, is an axially movable annular piston 85, the piston and housing being formed to provide therebetween an annular chamber 86 to which oil under pressure may be admitted from the interior of drive shaft 30 through ports 134 in the drive shaft and registering ports 89 in clutch cylinder 84, to displace piston 85 to the left, as shown in FIGURE 1, and thereby to engage the clutch plates 83 to drive the planet carrier. Springs 90, acting between clutch cylinder 84 and piston 85 serve to disengage the clutch when the supply of oil under pressure to chamber 86 is interrupted. A thrust nut 92, threaded on drive shaft 30, prevents displacement of clutch cylinder 84 in an axial direction away from clutch plates 83, and provides for adjustment of the clutch elements to compensate for wear. Thrust plate 67 is interposed between clutch plates 83 and sun member 45 to serve as an abutment against which the clutch plates react when the clutch is engaged.

The clutch for coupling sun member 45 to drive shaft 30 is similarly constructed. Secured to the left-hand end of sun member 45 as viewed in FIGURE 1 is a clutch collar 93, the collar being internally splined. External splines 94 are provided on drive shaft 30, and alternate clutch plates 96 are thereby keyed to collar 93 and drive shaft 30 to couple these members upon the application of axial pressure to clutch plates 96. Disposed within a clutch cylinder 98 mounted on drive shaft 30 is a piston 99. When oil under pressure is admitted from the interior of drive shaft 30 through ports 133 in the shaft and ports 102 in clutch cylinder 98 into chamber 104 between clutch cylinder 98 and piston 99, clutch plates 96 are engaged to drive sun member 45 from drive shaft 30. The clutch is disengaged by springs 105 acting between cylinder 98 and piston 99 on interruption of the supply of oil under pressure to chamber 104. Thrust nut 106, threaded on drive shaft 30 acts through the inner race of bearing 36 and thrust ring 97 to resist axial displacement of clutch cylinder 98 away from clutch plates 96, and allows adjustment of the clutch for wear. Thrust plate 108 is interposed between clutch 96 and clutch collar 93 to serve as an abutment against which the clutch plates 96 react when the clutch is engaged.

Drive shaft 30 is provided further with radial ports 132 near its left-hand end, and with radial ports 135 and 136 near its right-hand end. Ports 132 communicate with ports 101 extending through thrust ring 97. Thus when ports 132 and 133 are placed in communication, pressure in clutch cylinder 98 is relieved. Similarly, ports 135 communicate with the interior of intake bell 25, so that when ports 134 and 135 are placed in communication, pressure in clutch cylinder 84 is relieved.

Oil flow to effect selective engagement and release of the two clutches is controlled by a valve 110 disposed within and extending longitudinally of bore 112 in drive shaft 30. Valve 110 is of less diameter than bore 112 to provide therebetween an annular passage 115 extending over the major portion of the length of the valve. As shown in FIGURES 11 and 12, valve 110 is provided with an internal bore 114, communicating with annular passage 115 through drill holes 116 and 118. The valve is also provided with enlarged shoulders 124, 125, 126, and 122, having a sliding fit in drive shaft bore 112, shoulder 122 having radial ports 120. It will be perceived that oil under pressure supplied to the left-hand end of bore 114 may flow freely into all portions of the annular passage 115 between the valve and the drive shaft except those portions intermediate the shoulders 124, 125 and intermediate the shoulders 122 and 126.

Valve 110 may be displaced axially, either manually or automatically, to any of three positions, two of which are shown in FIGURES 11 and 12. In FIGURE 11, valve 110 is shown in its left-hand or low speed position in which ports 132 and 136 are blocked, ports 134 and 135 are in communication, relieving the pressure in clutch cylinder 84, oil under pressure being supplied from bore 114 through communicating ports 133 and 102 to clutch cylinder 98, displacing piston 99 to the right, whereby the associated clutch plates 96 are engaged to couple sun member 45 to drive shaft 30. Rotation of sun member 45 imparts orbital motion at low speed to impeller 39 through the planet carrier as hereinbefore described.

In FIGURE 12, valve 110 is shown in its right-hand or high speed position. Ports 132 and 133 in drive shaft 30 are now in communication, relieving the pressure in clutch cylinder 98 and releasing clutch plates 96. Ports 135 and 136 are blocked, and ports 134 are in communication with the interior of valve 110, thus supplying oil under pressure through ports 89 to clutch cylinder 84 and displacing piston 85 to the left, whereby the associated clutch plates 83 are engaged to couple planet carrier end plate 40 and drive shaft 30. Rotation of the planet carrier imparts orbital motion at high speed to impeller 39.

When valve 110 occupies a third position intermediate the positions illustrated in FIGURES 11 and 12, ports 132, 133, 134 and 135 are blocked, and ports 136 are aligned with ports 120 in valve 110. Oil under pressure is discharged from bore 114 through aligned ports 120 and 136 into the interior of intake bell 25, circulates through the moving parts of the compressor, and is returned to the oil pump.

At an intermediate point in its length, drive shaft 30 is provided with radial passages affording communication between the exterior and the interior of the shaft, these passages being normally blocked by check valves 128, which are so adjusted that when oil pressure within the shaft exceeds a predetermined value, oil is discharged outwardly past the valves 128 to the interior of sun member 45, and is returned to the oil pump as hereinafter described. Development of excessive oil pressure is thereby prevented.

Oil under pressure for the lubrication of the component parts of the compressor, and for the selective actuation of the clutches, is derived from an oil pump driven from the left-hand end of drive shaft 30 as shown in FIGURE 1. The pump, illustrated in detail in FIGURES 13 to 15, may comprise three plates, 138, 139 and 140, surrounding the drive shaft and clamped between the oil bell 33 and the exhaust bell 32 by bolts 142. A central gear 143 and three circumferentially spaced outer gears 144 are supported in intermeshing relation in the plane of intermediate plate 139, being supported on pins 141 extending between outer plates 138 and 140. Plate 140 is recessed as indicated at 145 to provide, in conjunction with recesses 146 in the confronting face of plate 139, inlet passages for oil, the recesses extending from the periphery of the plates and terminating at their inner ends adjacent the meshing zone of gear 143 and each of the gears 144. Oil from reservoir 150 flows through passages 152 into the oil inlet recesses 145, 146. Plate 138 is apertured at 148 at the opposite side of the meshing zone of each of the gears 144 to provide discharge ports in communication at the left-hand end of drive shaft 30 with bore 112, the oil being thence conducted through drill holes 116 into bore 114 in valve 110.

The normal oil level in the compressor is preferably near the axis of drive shaft 30, filling oil reservoir 150, the latter forming with fluid discharge chamber 79 a continuous annular space defined between oil bell 33 and exhaust bell 32 whereby the pressure of fluid discharging from the impeller is applied to the oil, assisting the oil pump in forcing oil toward the opposite end of the unit for lubrication and for selective operation of the clutches. The flow of oil from the pump and through the component parts of the impeller is indicated by arrows in FIGURE 1, it being appreciated that ducts not appearing in that figure are provided where necessary to allow free flow. The entire interior of the housing is effectively lubricated owing to the fact that the oil is churned by the moving parts into a mist or froth, which permeates the whole unit. Oil is, of course, supplied directly to the fluid compression chamber 68, 69, 70 to lubricate the contacting surfaces of the impeller 39 and the cylinder wall, which have sliding engagement due to the fact that the impeller is restrained from rotation and therefore does not partake of pure rolling action within the cylinder. The planet rollers 54, 55 and 56 are also bathed in oil.

In FIGURE 17 is illustrated means for effecting selection of either of the clutches in response to variation in speed of drive shaft 30. For this purpose the drive shaft 30 and the valve 110 may be extended through the left-hand end of the compressor housing as shown in FIGURE 1. A sleeve 160 is fitted on the shaft 30 and secured in position by set screws 165, an oil seal 168 being introduced between shaft 30 and valve 110 to prevent oil leakage. Governor arms 162, supporting weights 164 at their outer ends, are pivoted between ears 161 formed on sleeve 160, the inner ends of the arms projecting through slots in the sleeve 160 and drive shaft 30, and engaging an annular groove 169 in valve 110.

It will be perceived that as the speed of rotation of drive shaft 30 is increased above a predetermined value, the weights 164 will move outwardly to displace the valve 110 toward the left as shown in FIGURE 17, whereby clutch plates 96 will be engaged as hereinbefore described to couple sun member 45 to drive shaft 30, whereby impeller 39 is driven at reduced speed with relation to the speed of drive shaft 30. When the speed of rotation of drive shaft 30 falls below the predetermined value, weights 164 will move inwardly, thereby displacing valve 110 to the right as shown in FIGURE 17, engaging clutch plates 83, thereby coupling planet carrier end plate 40 to drive shaft 30, whereby impeller 39 is driven at a higher speed with relation to the speed of drive shaft 30, as hereinbefore described.

An arrangement for effecting automatic selection of the two clutches in response to variation in speed of rotation of drive shaft 30 is highly desirable in the use of the compressor in air conditioning systems for motor vehicles, in which the drive shaft is ordinarily driven from the vehicle motor, operated at widely varying speeds. It will be appreciated, however, that other means of effecting the automatic selection may be employed. For instance, the valve 110 may be shifted in response to variation in lubricant pressure above and below a predetermined value, since the lubricant pressure varies as a function of the speed of the drive shaft.

Having thus described the invention, what is claimed as new and desired to be secured by Letters Patent is:

1. In a rotary fluid compressor, the combination with a cylinder, of an annular impeller having an external diameter less than the internal diameter of the cylinder, a carrier supported for rotation on the cylinder axis, rollers mounted on said carrier for rotation on axes parallel to the cylinder axis and engaging the inner surface of said annular impeller to impart to the latter an orbital movement such that the external surface of said impeller maintains circumferentially progressive contact with the cylinder, a cylindrical sun member supported for rotation within said carrier on the cylinder axis, said rollers being of different diameter and being so disposed radially of the carrier as to engage said sun member, a drive shaft coaxial with said sun member and extending therethrough, means selectively operable to couple either said sun member or said carrier to said drive shaft for rotation therewith, a plurality of circumferentially spaced vanes extending axially of said cylinder and defining with said cylinder and impeller a plurality of separate compression chambers, said cylinder and impeller being provided with axially extending recesses in the opposed surfaces thereof to receive said vanes, said cylinder being formed to provide an inlet and an exhaust port in communication with each of said chambers, check valves associated with said ports, a compressor housing, means journaling said drive shaft in said housing, and means journaling said sun member and carrier in said housing independently of said drive shaft.

2. In a rotary fluid compressor, the combination with a cylinder, of an annular impeller having an external diameter less than the internal diameter of the cylinder, a carrier supported for rotation on the cylinder axis, rollers mounted on said carrier for rotation on axes parallel to the cylinder axis and engaging the inner surface of said annular impeller to impart to the latter an orbital movement such that the external surface of said impeller maintains circumferentially progressive contact with the cylinder, a cylindrical sun member supported for rotation within said carrier on the cylinder axis, said rollers being of different diameter and being so disposed radially of the carrier as to engage said sun member, a drive shaft coaxial with said sun member and extending therethrough, and means selectively operable to couple either said sun member or said carrier to said drive shaft for rotation therewith, or to disconnect both said sun member and said carrier from said drive shaft, a compressor housing, means journaling said drive shaft in said housing, and means journaling said sun member and carrier in said housing independently of said drive shaft.

3. In a rotary fluid compressor, the combination with a cylinder, of an annular impeller having an external diameter less than the internal diameter of the cylinder, a carrier supported for rotation on the cylinder axis, rollers mounted on said carrier for rotation on axes parallel to the cylinder axis and engaging the inner surface of said annular impeller to impart to the latter an orbital movement such that the external surface of said impeller maintains circumferentially progressive contact with the cylinder, a cylindrical sun member supported for rotation within said carrier on the cylinder axis, said rollers being of different diameter and being so disposed radially of the carrier as to engage said sun member, a drive shaft coaxial with said sun member and extending therethrough, clutches responsive to fluid under pressure to couple either said sun member or said carrier to said drive shaft for rotation therewith, an oil pump supplying lubricant to moving parts of said compressor, means selectively operable to supply oil discharged from said pump to either of said clutches to engage the latter, a compressor housing, means journaling said drive shaft in said housing, and means journaling said sun member and carrier in said housing independently of said drive shaft.

References Cited in the file of this patent

UNITED STATES PATENTS

| | | |
|---|---|---|
| 1,079,560 | Kinney | Mar. 25, 1913 |
| 1,350,159 | Johnson | Aug. 17, 1920 |
| 1,659,107 | Huid | Feb. 14, 1928 |
| 1,679,592 | Williams | Aug. 7, 1928 |
| 1,935,096 | Muller | Nov. 14, 1933 |
| 1,961,592 | Muller | June 5, 1934 |
| 2,092,104 | Bawden | Sept. 7, 1937 |
| 2,147,334 | Boysson | Feb. 14, 1939 |
| 2,391,648 | Seybold | Oct. 27, 1943 |
| 2,922,378 | Pabst | Jan. 26, 1960 |

FOREIGN PATENTS

| | | |
|---|---|---|
| 20,930 | Netherlands | Apr. 15, 1930 |